(12) United States Patent
Olofsson

(10) Patent No.: US 8,531,943 B2
(45) Date of Patent: Sep. 10, 2013

(54) MESH NETWORK

(75) Inventor: Andreas Olofsson, Lexington, MA (US)

(73) Assignee: Adapteva Incorporated, Bedford, MA (US)

( * ) Notice: Subject to any disclaimer, the term of this patent is extended or adjusted under 35 U.S.C. 154(b) by 443 days.

(21) Appl. No.: 12/608,684

(22) Filed: Oct. 29, 2009

(65) Prior Publication Data
US 2010/0111088 A1    May 6, 2010

Related U.S. Application Data

(60) Provisional application No. 61/197,498, filed on Oct. 29, 2008.

(51) Int. Cl.
*H04L 12/50* (2006.01)
*H04Q 11/00* (2006.01)

(52) U.S. Cl.
USPC .......................................... 370/229; 370/235

(58) Field of Classification Search
None
See application file for complete search history.

(56) References Cited

U.S. PATENT DOCUMENTS

| | | | | |
|---|---|---|---|---|
| 4,598,400 | A * | 7/1986 | Hillis | 370/400 |
| 5,590,345 | A | 12/1996 | Barker et al. | |
| 5,826,049 | A * | 10/1998 | Ogata et al. | 710/317 |
| 6,041,398 | A | 3/2000 | Pechanek et al. | |
| 6,988,170 | B2 | 1/2006 | Barroso et al. | |
| 7,301,941 | B2 | 11/2007 | Dally | |
| 2002/0198911 | A1 * | 12/2002 | Blomgren et al. | 708/232 |
| 2006/0031659 | A1 | 2/2006 | Chow | |
| 2006/0049468 | A1 | 3/2006 | Cheng et al. | |
| 2007/0136560 | A1 * | 6/2007 | Kirsch | 712/14 |
| 2008/0211538 | A1 | 9/2008 | LaJolo et al. | |

FOREIGN PATENT DOCUMENTS

EP    1001351 A1    5/2000

OTHER PUBLICATIONS

N. Kapre, Packet-Switched FPGA Overlay Networks, Master's Thesis, California Institute of Technology, 2006, pp. 1-91.*
J. Oritz, Design of Components for a NoC-Based MPSoC Platform, Jun. 30, 2005, pp. 1-88.*
R. Gindin, I. Cidon, I. Kedir, Architecture and Routing in NOC based FPGAs, CCIT Report No. 579, Technion Department of Electrical Engineering, 2006, pp. 1-17.*
E. E Bolotin, I. Cidon, R. Ginosar, A. Kolodny, QoS Architecture and Design Process for Cost Effective Network on Chip, Journal of Systems Architecture, special issue on NoC, 50(2-3), pp. 105-128, 2004.*
Z. Ai-Awwami, M. Obaidat, M. Al-Mulhwm, A New Deadlock Recovery Mechanism for Fully Adaptive Routing Algorithms, Proceedings of the IEEE International Conference on Performance, Computing, 2000, pp. 132-138.*

(Continued)

*Primary Examiner* — John Blanton
*Assistant Examiner* — Christopher Crutchfield
(74) *Attorney, Agent, or Firm* — Wilmer Cutler Pickering Hale and Dorr

(57) ABSTRACT

A mesh network has a plurality of nodes that can be arranged in a two or three dimensional arrangement. The address-based mesh routing scheme sends a full address and full data on every clock cycle. The system can include broadcasting to columns, rows, planes, or all system elements using a single data transaction. A selectable routing scheme can be random, fixed, or adaptive, depending on user configuration. A registered transaction-weight scheme is provided that can stall transactions in a mesh without having to resend data.

9 Claims, 14 Drawing Sheets

(56) References Cited

OTHER PUBLICATIONS

F. Moraes, N. Calazans, A. Mello, L. Moller, L. Ost, Hermes: an Infrastructure for Low Area Overhead Packet-switching Networks on Chip, Technical Report 034, PURCS—Brazil, pp. 1-22, Oct. 2003.*

Hoskote, et al., "A 5-GHz Mesh Interconnect for a Teraflops Processor," IEEE Computer Society, Sep.-Oct. 2007, 51-61 (11 pages).

Lattard, et al., "A Reconfigurable Baseband Platform Based on an Asynchronous Network-on-Chip," IEEE Journal of Solid State Circuites, vol. 43, No. 1, Jan. 2008, 223-235 (13 pages).

Hu et al.,"DyAD—Smart Routing for Networks-on-Chip," DAC, Jun. 2004, pp. 1-4.

Salminen, et al., "On network-on-chip comparison," Euromicro Conference on Digital System Design, Aug. 27-31, 2007, pp. 503-510 (8 pages).

Wentzlaff, "On-Chip Interconnection Architecture of the Tile Processor," IEEE Computer Society, 2007, 15-31 (17 pages).

Adelman, et al., "A 600MHZ DSP with 24 Mb Embedded Dram with an Enhanced Instruction Set for Wireless Communication," IEEE International Solid-State Circuits Conference, 2004, pp. 1-7.

Yu, "High Performance and Energy Efficient Multi-core Systems for DSP Applications," Dissertation, Fundan University, 2007, pp. 1-162.

International Search Report and Written Opinion of the International Searching Authority, the Korean Intellectual Property Office, for PCT/US2009/062587, mailing date of Jun. 15, 2010, 7 pages.

* cited by examiner

XADDR=000
YADDR=111
ZADDR=000

810

XADDR=111
YADDR=011
ZADDR=000

820

XADDR=111
YADDR=111
ZADDR=000

830

XADDR=111
YADDR=111
ZADDR=111

840

MESH NETWORK

CROSS-REFERENCE TO RELATED APPLICATION

This application claims priority under 35 U.S.C. Section 119(e) to Provisional Application Ser. No. 61/197,498, filed Oct. 29, 2008, which is incorporated herein by reference.

FIELD OF THE INVENTION

The invention relates to circuits for interconnecting a number of blocks on single chip using a coordinate based addressing scheme and a transaction based interconnect network.

BACKGROUND

With the emergence of multicore processing architectures and parallel processing arrays on a single die, the efficiency and throughput of on-chip can become a bottleneck that can keep a system on a chip from reaching a peak theoretical performance. Shared bus architectures, such as the AMBA bus and AXI bus, have limited scalability and cannot be used to interconnect more than a dozen masters without suffering from size and timing penalties. With the number of processing elements increasing, a traditional shared bus network might not be sufficient.

Work has been done in creating Networks on a Chip (NOC) to improve the scalability and performance of on-chip networks. Some interconnection architectures that have been proposed include torus networks, mesh networks, and tree networks. Much of the detailed work on NOCs has borrowed concepts from traditional packet based systems. To improve data routing efficiency and prevent deadlocks in the network, sophisticated techniques have been employed, including packetizing of data, breaking packets into sub-packets called flits, allowing for worm hole routing, and inserting FIFO buffering at each interconnection node in the network.

Three dimensional networks are already employed in real consumer products. Many cell-phones are using stacked chip technology. IBM recently announced silicon through via technology that is close to production.

The efficiency of an NOC is dependent on a number of different factors, such as network topology, routing algorithms, packet strategy, buffer sizes, flow control, and quality of service support.

The network topology defines the layout of the wires that connects nodes in the network together. Some common topologies include mesh, torus, binary tree, hierarchical, honeycomb, and rings. The ideal topology will depend on the application at hand and the technology used as an interconnection fabric. NOCs for example have very different cost trade offs from interchip networks. For interchip networks, wires and pins can be expensive and should be minimized, whereas in intrachip networks, wires are almost free.

The routing algorithm determines how data is routed from the source to the destination. Paths can be set up at the source or done in a distributed fashion at each node. A well designed routing algorithm will minimize traffic hotspots to improve the throughput of the network without adding significant complexity.

Flow control dictates the movement of packets along the network using at least one stage of buffering at each routing node. When a downstream buffer is unavailable, backwards pressure is asserted to stop transactions from proceeding. Some common methods for creating backwards pressure are: credit based, on/off, and ack/nack buffer flow control.

A large portion of NOC area and power is dedicated to buffering so choosing the correct buffer size is key to achieving a well balanced network. Large buffers allow the network to operate closer to peak capacity by temporarily storing data in buffers when there is link contention. As long as the pressure on the local link goes away before the buffer fills up, throughput is not compromised. Buffers are thus especially effective for random traffic that is not overly bursty.

SUMMARY

A network on a chip architecture described herein can lead to significantly reduced power and area compared to existing solutions while providing a very high bandwidth for interprocessor communication.

The architecture uses a 3D address based mesh routing scheme that does not use packets, but rather sends full address and a full data on every clock cycle. The circuit uses a 3D grid of elements addressable by dedicated X, Y, and Z coordinate fields within the transaction address. Each processor is addressable through a unique x, y, and z coordinate that reflects the processor's physical position. Instead of packetizing data, each transaction consists of an address and data. This means that software programs can directly access other cores by simply addressing that part of the address space.

A method is provided for broadcasting data to columns, rows, planes, and all of the system elements using a single data transaction. For some applications, parallel execution of data relies on efficient broadcasting of data to multiple processors. By having a shared memory architecture with broadcast address space built into the architecture, a high efficiency broadcast system can be created.

A selectable routing scheme can be used that can be random, fixed, or adaptive depending on user configuration. Depending on the application and scenario, one routing algorithm may be preferred over another. Having software control over the routing method chosen at each interconnect node gives flexibility and can increase the network performance in many applications. The adaptive and random routing methods can be implemented with the mesh network described here, but could be problematic with a packet based network-on-a-chip because of ordering.

A registered transaction-wait scheme that stalls transactions in the mesh without having to resend data can be used. A wait signal creates back pressure, which allows single distributed stalling of signal without having to send a global interconnect.

The system can avoid using global interconnects making the network infinitely scalable. There is a one clock cycle latency at every interconnect node, for the transaction and the wait signal. This makes for a low latency network with virtually limitless scalability. In the case of a 8×8 processor array, the propagation delay from the upper left corner to the right corner is a predictable 16 clock cycles, assuming there is no contention at any of the interconnect nodes.

Other features and advantages will become apparent from the following description, drawings, and claims.

DETAILED DESCRIPTION

Figure 1A:
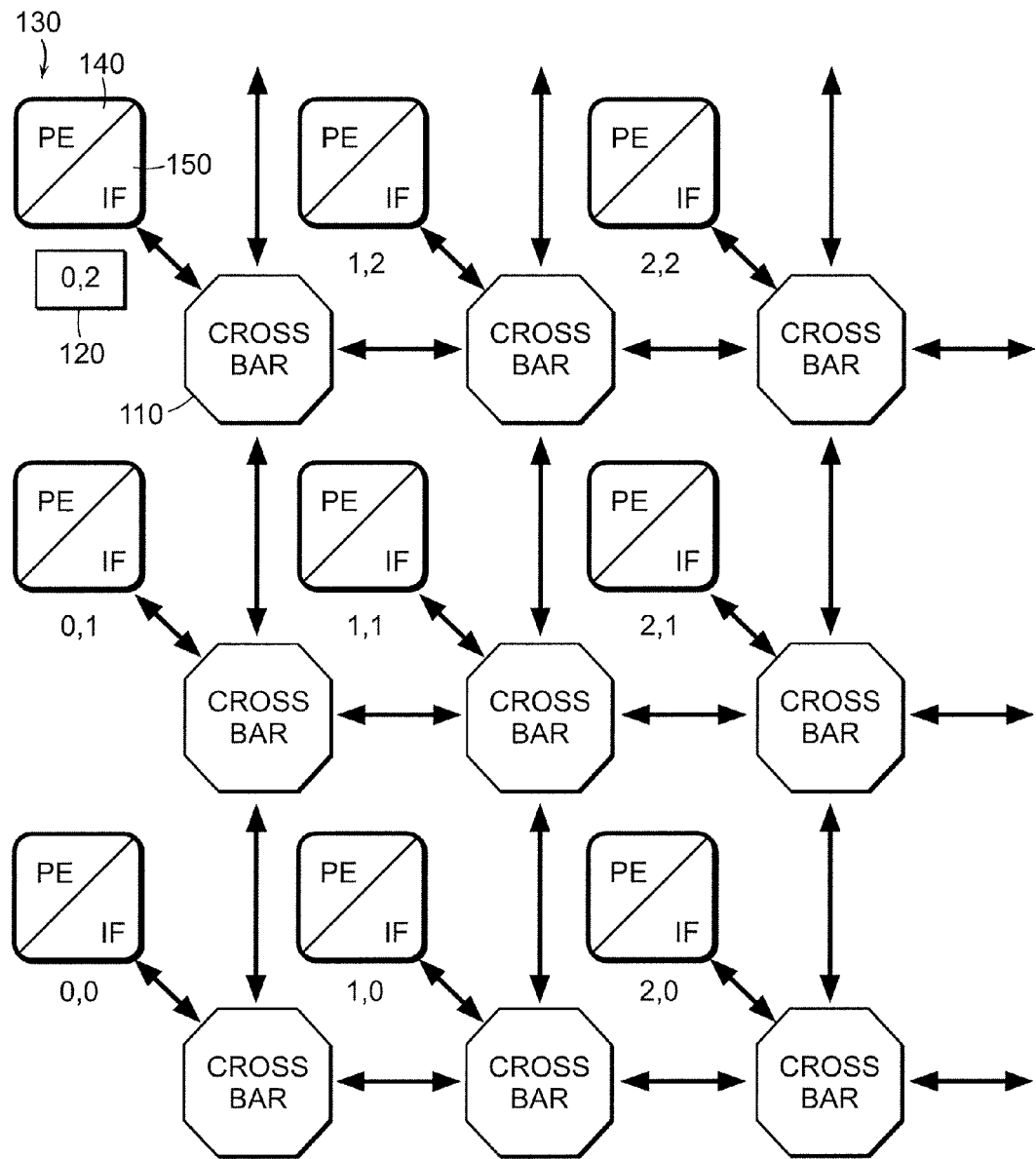
FIG. 1A is a schematic showing multiple processing elements and cross-bar switches.

FIG. 1A illustrates a high level overview of a mesh network architecture with processing nodes 130 and crossbar nodes 110. Each crossbar node 110 in the array has an fixed coordinate 120 that reflects its position in a three-dimensional geometrical space. When a transaction arrives at a processing node, the address of the transaction is compared to the coordinate of the router node to determine the direction that the transaction should be sent to. In a three dimensional network of processors, the directions could be described as up, down, east, west, north, or south in a 3D system. If the router determines that the coordinates of the router node exactly matches the coordinate portion of the transaction address, the transaction is sent to the router's attached processing node 130 and the transaction is completed.

Each processing node has a processing element (PE) 140 and an interface (IF) (150). The processing element could be a software programmable processor, a hardware accelerator, or a piece of memory. One type of processing element that can be used is described, for example, in provisional application No. 61/197,511, filed Oct. 29, 2008, and the related application Ser. No. 12/608,339, filed Oct. 29, 2009. The processing element is able to send and receive mesh transactions that are compatible with the mesh network. A mesh transaction is a single cycle transaction and includes, in the case of a write transaction, a write indicator, a destination address, and data; and in the case of a read transaction, a read indicator, a source address, and a destination address. Read transactions are performed as split transactions. The coordinates of the node initiating a read transaction are sent along with the read transaction to fetch the data. When the data is fetched, the read transaction is turned into a write transaction and the original source coordinates are used as a destination address to be sent along with the data. The read and write can include a data width field, such as a 2-but field for indicating data that is 8, 16, 32, or 64 bits. The data length can be different than the address length, e.g., a 32-bit address and 64 bits of data in a write transaction.

Figure 1B:
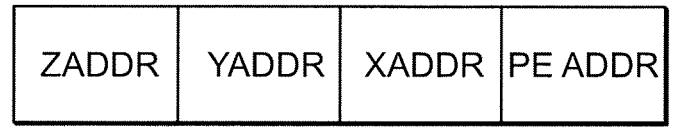
FIG. 1B shows an address space.

FIG. 1B shows how a transaction address is divided into separate fields, with the X, Y, and Z coordinates of the transaction at fixed locations within the address field. The address field is the same size as address space of the architecture. In a 32-bit memory architecture, the address used to route transactions in the mesh network would be 32 bits. In a 64-bit memory architecture, the address used to route a transaction through the mesh network would be 64 bits. The exact embodiment would depend on the size of a system. In a small embedded system with 64 cores, 32 bit addressability should be sufficient. For a supercomputer, a 64-bit addressable architecture would be more appropriate, and would allow each processor to be addressed using a single transaction.

Enforcing the transmission of an address with every data reduces energy efficiency, but has some advantages. The flat packet structure removes the need for packing and unpacking logic at the network interfaces. For nearest neighbor communication, the power and/or latency associated with packing and unpacking data can be significant when compared to the power of the links. Sending a 32-bit address also simplifies the routing logic because it creates a memory-less routing algorithm where each data can be routed to its destination independently from all other data transactions. Finally, the sending an address in parallel with data on every clock cycle increases efficiency for small size messages, enabling single word messages to be passed between processor in a single cycles. For shared memory multi-core solutions, having single cycle throughput for single word messages can significantly increase the efficiency of the software.

Figure 1C:
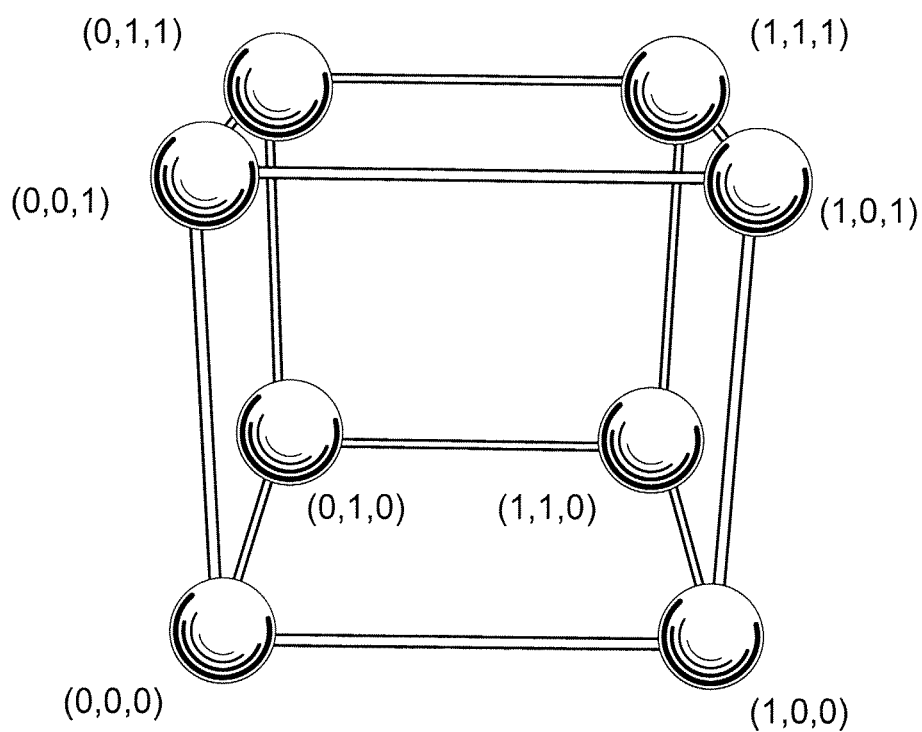
FIG. 1C represents a three-dimensional arrangement of processors.

FIG. 1C shows how the address-coordinates of the mesh network could be assigned in a three dimensional mesh network. All nodes in the system are addressable using distinct addresses. This addressing alleviates needing to use protocols, such as Message Passing Interfaces (MPI), that can have large overhead. A shared address space enables graceful sharing of variables and mailboxes across all of the cores.

This mesh network is designed to support 3D technology, although it should be clear that the 3D mesh network could easily be reduced to a planar 2D technology as well. In the case of a single die, the routing network area and power would be reduced since there would only be five routing directions (rather than seven) per mesh node and the arbiter would be less complex.

Figure 2:
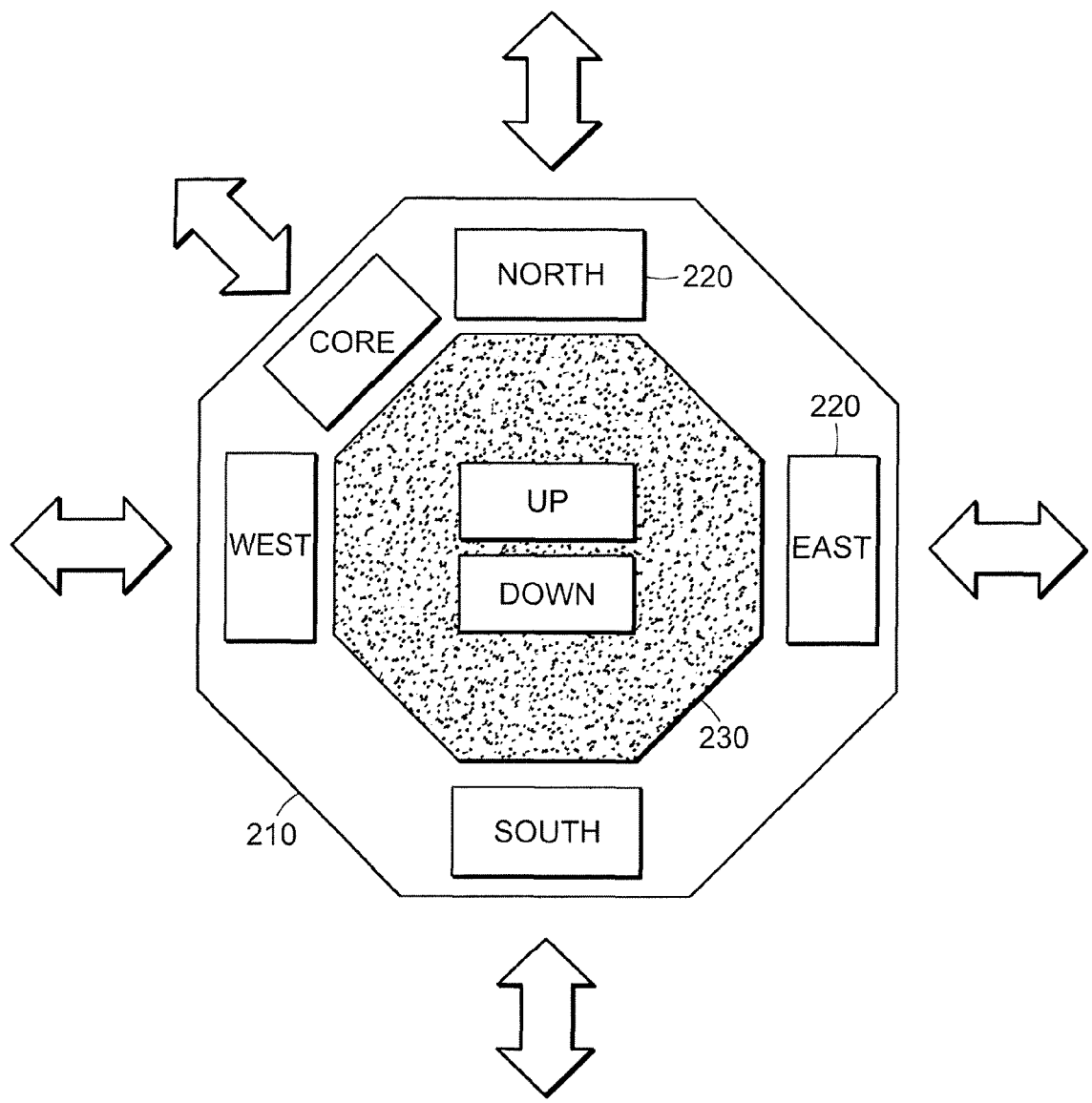
FIG. 2 is a high level view of each mesh node in the mesh network.

FIG. 2 shows a high level view of each mesh node in the mesh network. Each mesh node 210 can connect to 4 different directions in the 2D mesh configurations and 6 different directions in the 3D mesh configuration. The directions of connection to the processing element in a 3D configuration are referred to as North, South, East, West, Up, and Down. Each connection direction has a separate port 220 that decodes an incoming transaction and determines the direction to forward the transaction to. In addition, each port arbitrates between all possible incoming transactions. In this method, all to all communication is enabled through the crossbar 230.

Figure 3:
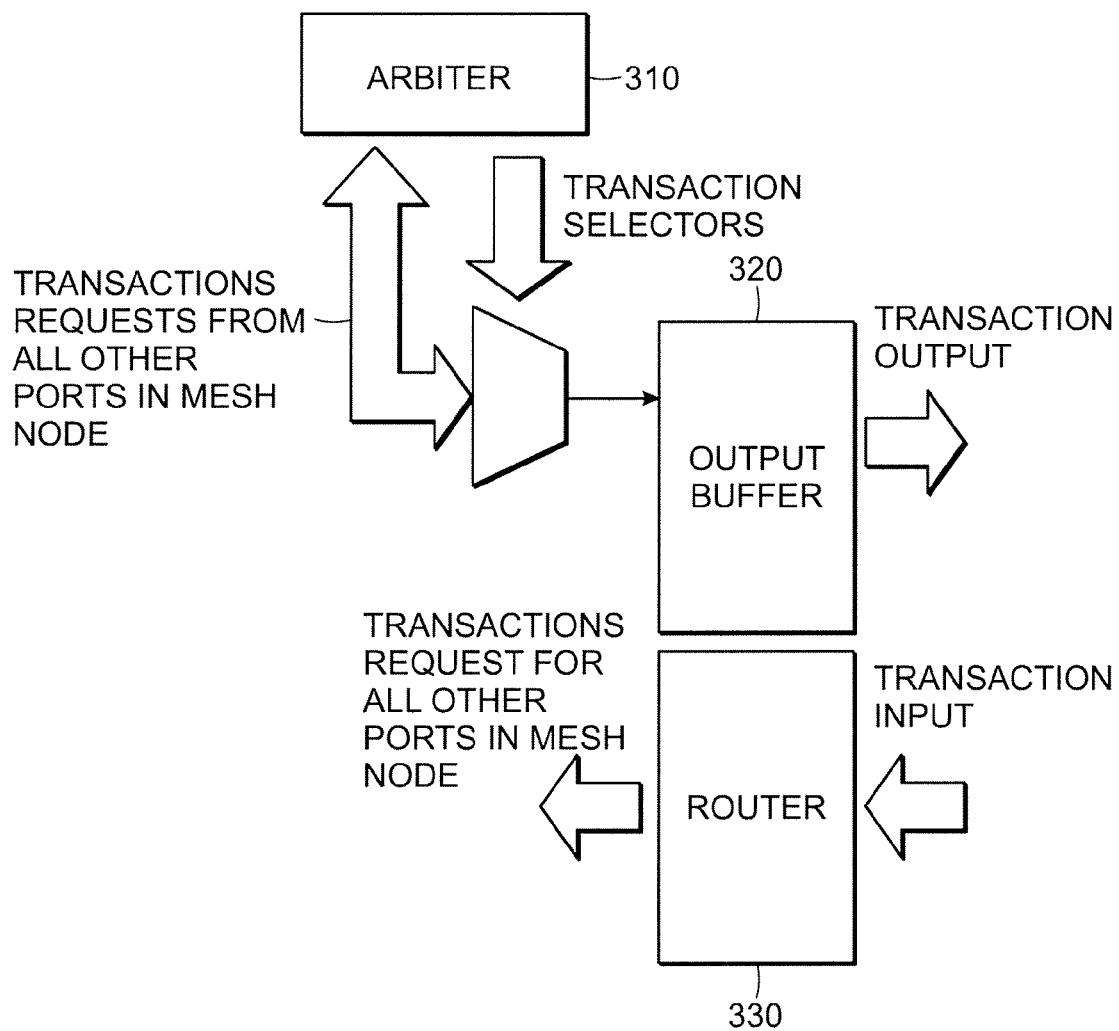
FIG. 3 is a circuit used in each of the ports of the mesh node.

FIG. 3 shows an embodiment of a circuit in each one of the ports in the mesh node. The port has a decoder that receives a transaction input and determines the direction to forward the transaction to at a router 330. An arbiter 310 determines which transaction to send to the output, and an output buffer 320 registers the data before sending in onwards to the next mesh node. Arbiter 310 can be any one of generally used arbiters, such as a simple fixed priority arbiter, a round robin arbiter, or a more sophisticated time sliced arbiter. The decision of which arbiter to use would typically depend on the hardware versus performance tradeoff in a specific application. Some signal processing applications with fixed communication patterns can use a simple priority arbiter, while systems with random traffic might need some type of round robin arbiter.

Routing in the mesh network is completely distributed, with each node in the mesh network deciding on the direction to send the transaction based on its own coordinates and the destination address of the transaction. One key to a simple routing scheme is the mapping of flat architectural address space onto the three dimensional physical mesh network.

Figure 4:
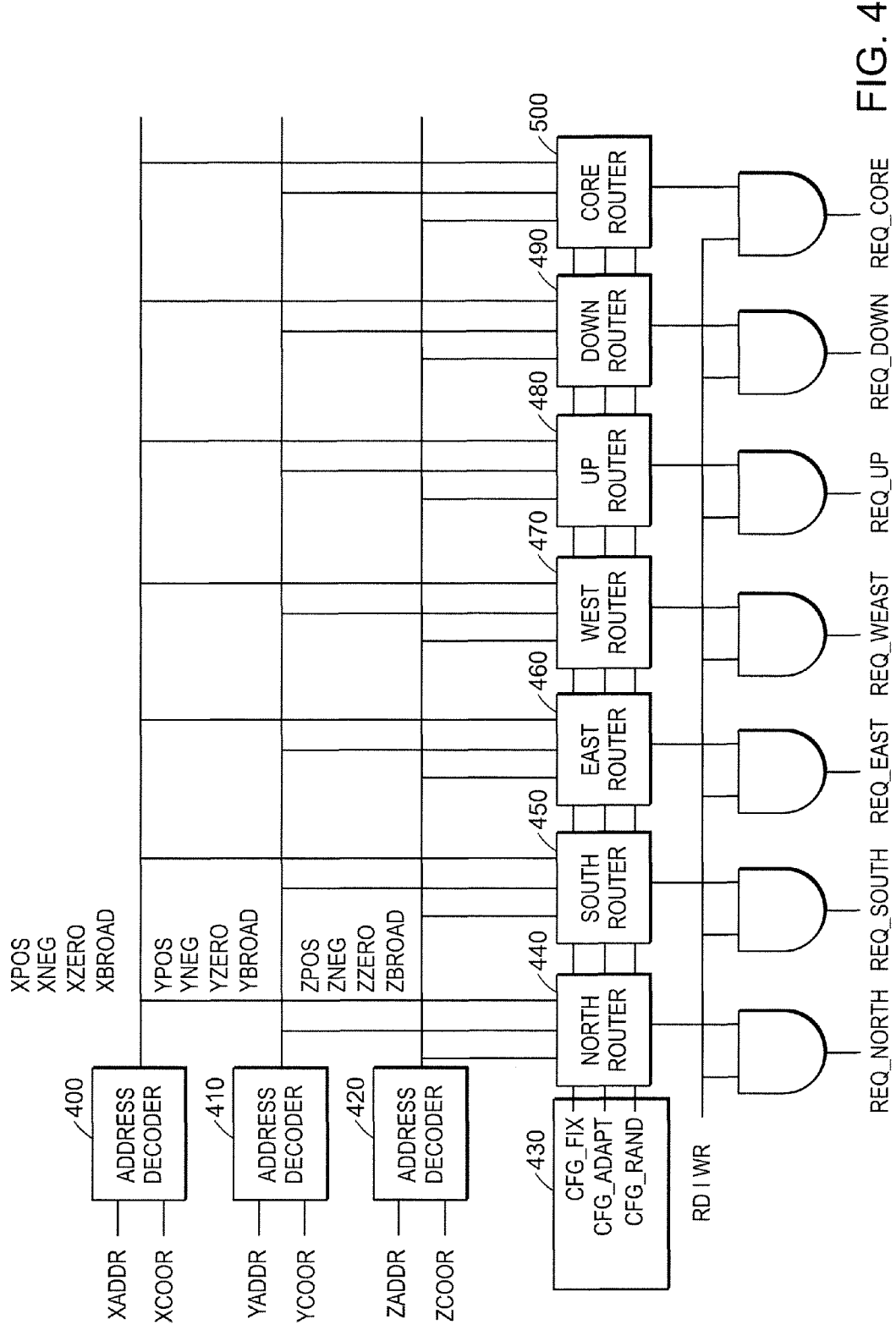
FIG. 4 is a schematic of a routing portion of a single node.

FIG. 4 shows the design of an embodiment of a routing portion of a single node in the 3D routing network. The transaction router has address decoders 400, 410, and 420 for the X-field, Y-field, and Z-field of the transaction address, respectively. The address comparators compare the address of the routing nodes coordinates with the destination address of the transaction to determine if the coordinate is greater than, equal to, or less than, the destination address. This comparison is done in all three dimensions. The address comparisons are used by the mesh-routers to determine the direction in which to send the transaction.

The routing algorithm is configurable by the user through writing to a memory mapped mesh control register 430 contained within each processing node. The control register affects the routing and arbitration behavior of the mesh network on a per node basis. By writing to the mesh node configuration register, the routing scheme can be configured as fixed, adaptable, or random. Fixed routing means that in the case that a transaction needs to move diagonally, the transaction is first moved along horizontally until the x-coordinate matches the x-address field, then it is routed vertically to the transactions final destination. Adaptable routing means that horizontal routing is preferred over vertical routing in diagonal routing, except in the case that the horizontal routing direction is blocked. In adaptive routing, if the router node can send the transaction in one of two directions it will try to send the transaction in a free direction if there is one. Random routing means that for diagonal routing, the preference of horizontal versus vertical routing is determined based on a random bit in the router node configuration register. The random bit is updated on every clock cycle, but can be read from and written to using a memory mapped transaction. In the case where a transaction arrives at a router node and there is a match in either the x-coordinate or y-coordinate, there is no choice as to the routing algorithm. In the embodiment here, transactions are sent towards a final destination without detour routing; i.e., the transaction always moves in the direction of the target.

The hardware description behavior of the directional routers 440, 450, 460, 470, 480, 490, and 500 for each one of the seven directions are shown below. As demonstrated, the broadcast detector and the configuration registers determine the method by which routing is carried out. Code represents the requests and assignments that are shown in the incorporated provisional patent application No. 61/197,498, filed Oct. 29, 2008.

Figure 5:
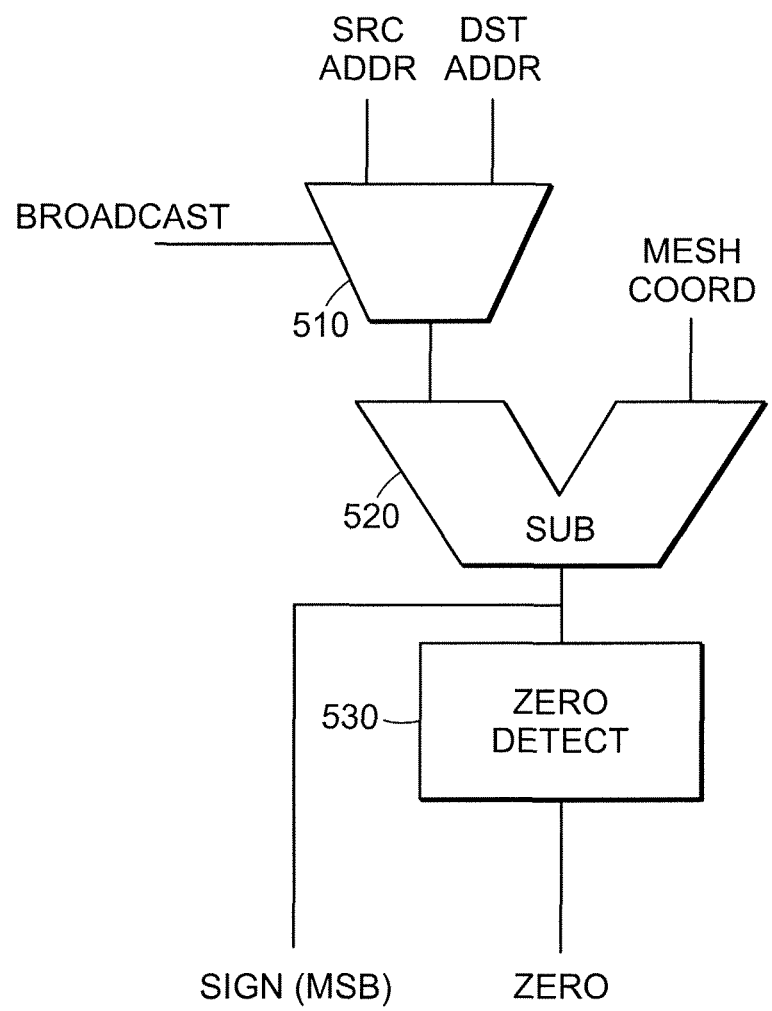
FIG. 5 is a block diagram of address comparator logic.

FIG. 5 illustrates an embodiment of address comparator logic. The address comparators has a comparator 520 that compares the transaction address (SCR Addr or DST Addr) with the coordinates of the mesh nodes (Mesh Coord). In case of write-broadcast mode, the transaction source coordinate is used in place of the destination address to determine the transaction routing direction. A zero detect circuit 530 is used to detect a match between the transaction address from comparator 520 and the mesh node coordinate. A positive, negative, or match indicator is derived from the sign (MSB) and zero indicator. The comparator circuit is instantiated once for each one of the x, y, and z dimensions.

Figure 6:
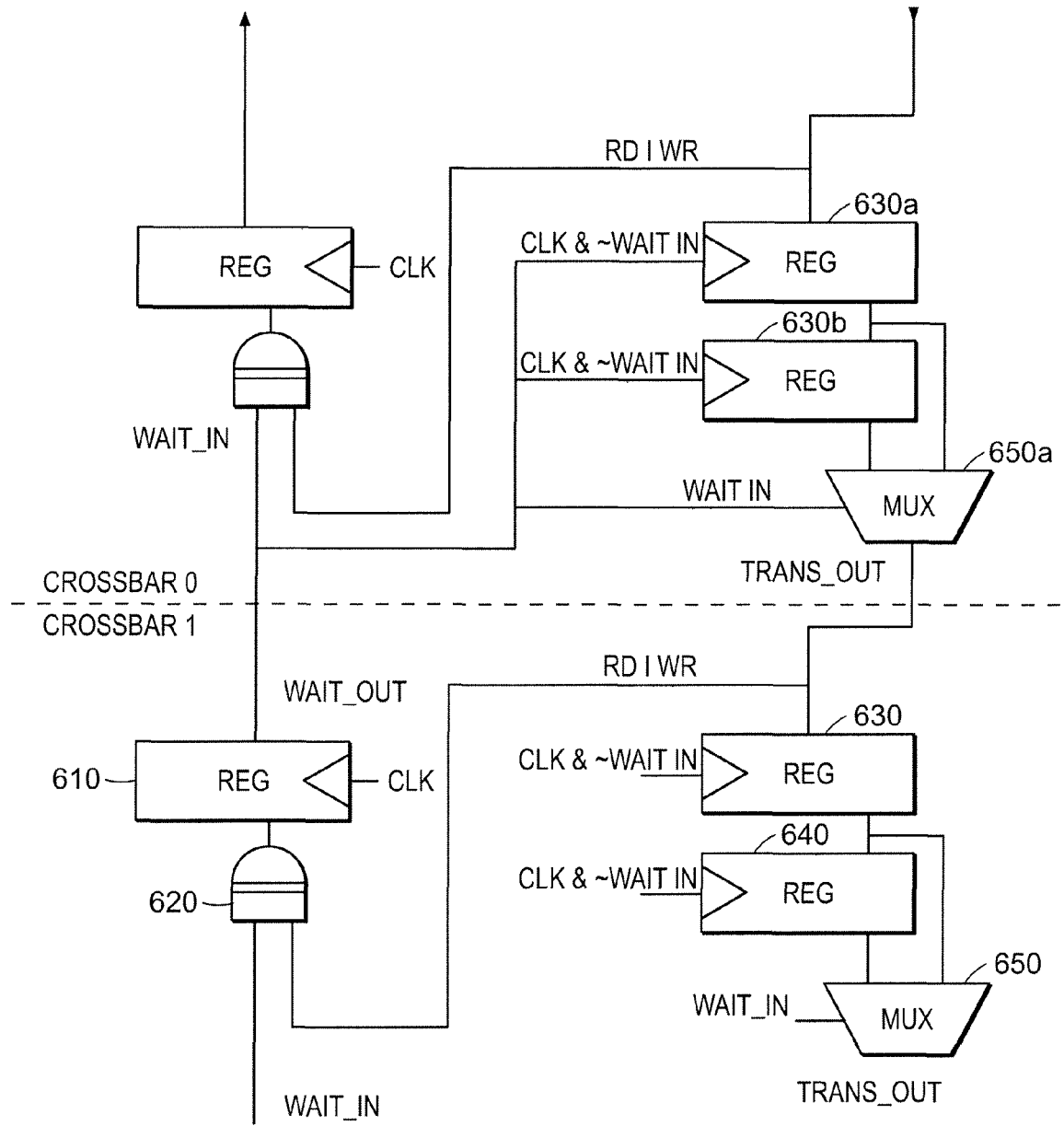
FIG. 6 is a schematic of circuitry demonstrating the use of the wait signal.

FIG. 6 shows a one dimensional slice of the mesh network intended to illustrate how the network can support a single cycle throughput while still allowing resource contention in the network. In this example, data is being sent from crossbar 0 to crossbar 1. The circuit in crossbar 0 receives a wait indicator (WAIT-OUT) from the direction that the circuit is trying to send data to (crossbar 1), and forwards the wait signal if there is a new incoming request signal, whether read or write 620. The wait signal is stored in a register 610 to make sure the timing between adjacent blocks can be met. A transaction is sampled at the output of the port of a mesh node as long as there is no incoming wait indication in a register 630. A second shadow register 640 and mux 650 are used to guarantee that when there is a wait signal no data is lost once the wait signal is released at the port input.

Crossbar 0 sends a TRANS_OUT message to crossbar 1. In the event that crossbar 1 sends a WAIT_OUT message to crossbar 0, which becomes for crossbar 0 a WAIT_IN message, it causes the crossbar 0 to hold the data to be sent. The data can be sent from register 630a to register 630b while it waits for a cycle, thus enabling data to be received in register 630a. On a next clock cycle, if the wait signal has cleared, the data can be provided from register 630b through mux 650a and then to register 630 in crossbar 1.

Figure 7:
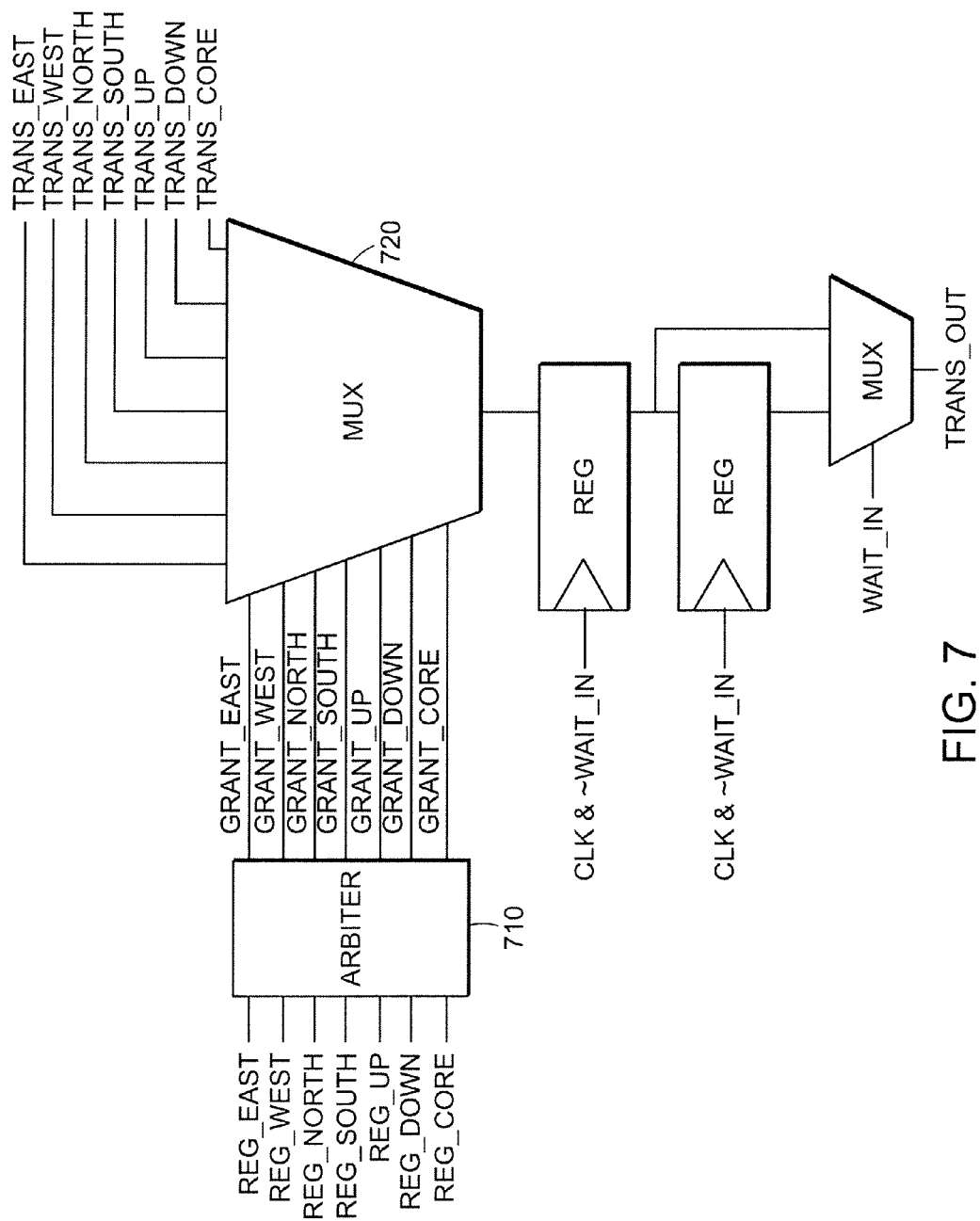
FIG. 7 is a schematic of an arbitration scheme.

FIG. 7 shows an embodiment of an arbitration scheme for the routing network. There is arbitration at each one of the nodes in the mesh network. In the most general embodiment, the arbitration scheme is a well known round robin scheme. Round robin arbitration means that the priority of the requests going into the arbiter is changing between transactions. For example, if a transaction from the North currently has the highest priority, then in the next transaction, transactions from the East (or some other pre-defined direction) has the highest priority. The circuit can be thought of as a shift register that wraps around itself. The round robin scheme ensures fairness in the network and guarantees that no source will be complete starved for bandwidth for more than 6 clock cycles.

The grant signals from an arbiter 710 are used to select a transactions with a parallel mux 720. The output of mux 720 goes into the output buffering network of the type described in conjunction with FIG. 6. A transaction that does not receive a grant signal automatically generates a WAIT indication in its backwards-going direction telling the previous mesh node or processing element that the pipeline is full and that there is no room for further instructions. The arbitration at each port can be fixed as well. The exact arbitration style is selectable using the mesh node control register and can be selectable using a software programmable register for every port in every mesh node in the system.

Figure 8:
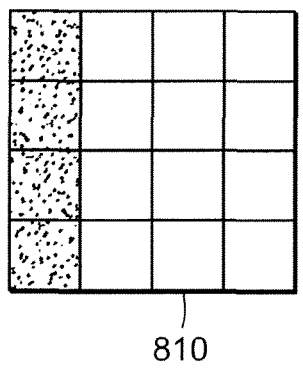
FIG. 8 shows views representing broadcasting to rows, columns, planes, or all nodes.
Figure 8:
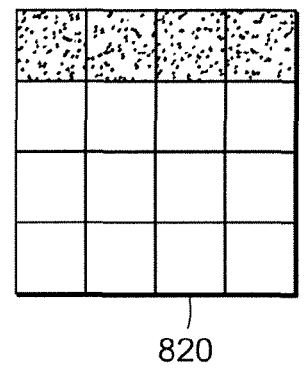
Figure 8:
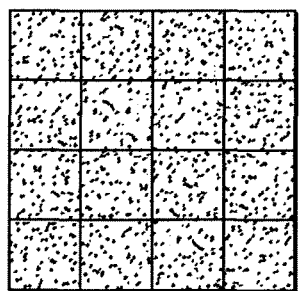
Figure 8:
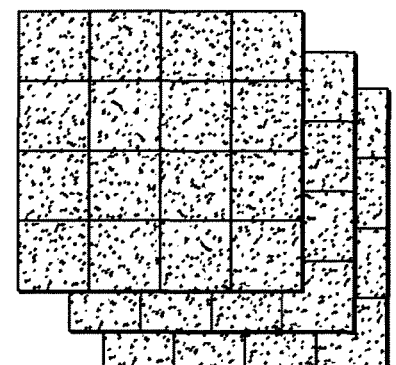

FIG. 8 illustrates methods by which data can be broadcast to multiple processing nodes. The broadcast modes supported are broadcast to a row 810, broadcast to a column 820, broadcast to a plane of the system 830, and broadcast to all processors 840. The broadcast mode is a dedicated section of the address space. The dedicated address space is encoded in the X, Y, and Z address fields. In the case of broadcasting to a column, the X address would be all 1's. In the case of broadcasting to a row, the Y address would be all 1's. In the case of broadcasting to a plane, the X and Y addresses would be all 1's. The X, Y, and Z broadcast spaces are independent so other combinations such as vertical planes and columns are also possible.

An aspect of the broadcasting modes is the address mux (FIG. 4), which allows the routing direction to be chosen based on the coordinates of the source node initiating the broadcast transaction. This guarantees that the transaction is always moving away from the source node in a wave-like fashion. In this routing scheme, the broadcast can be thought of as an arrow shot from the source node for a 1D broadcast, a pebble dropped in a pond for a 2D broadcast, and an free space explosion for a 3D broadcast. The broadcast is always moving away from the source node. Huygen's wave principle guarantees that there will be no mesh network contention in a 2D or 3D mesh.

Figure 9:
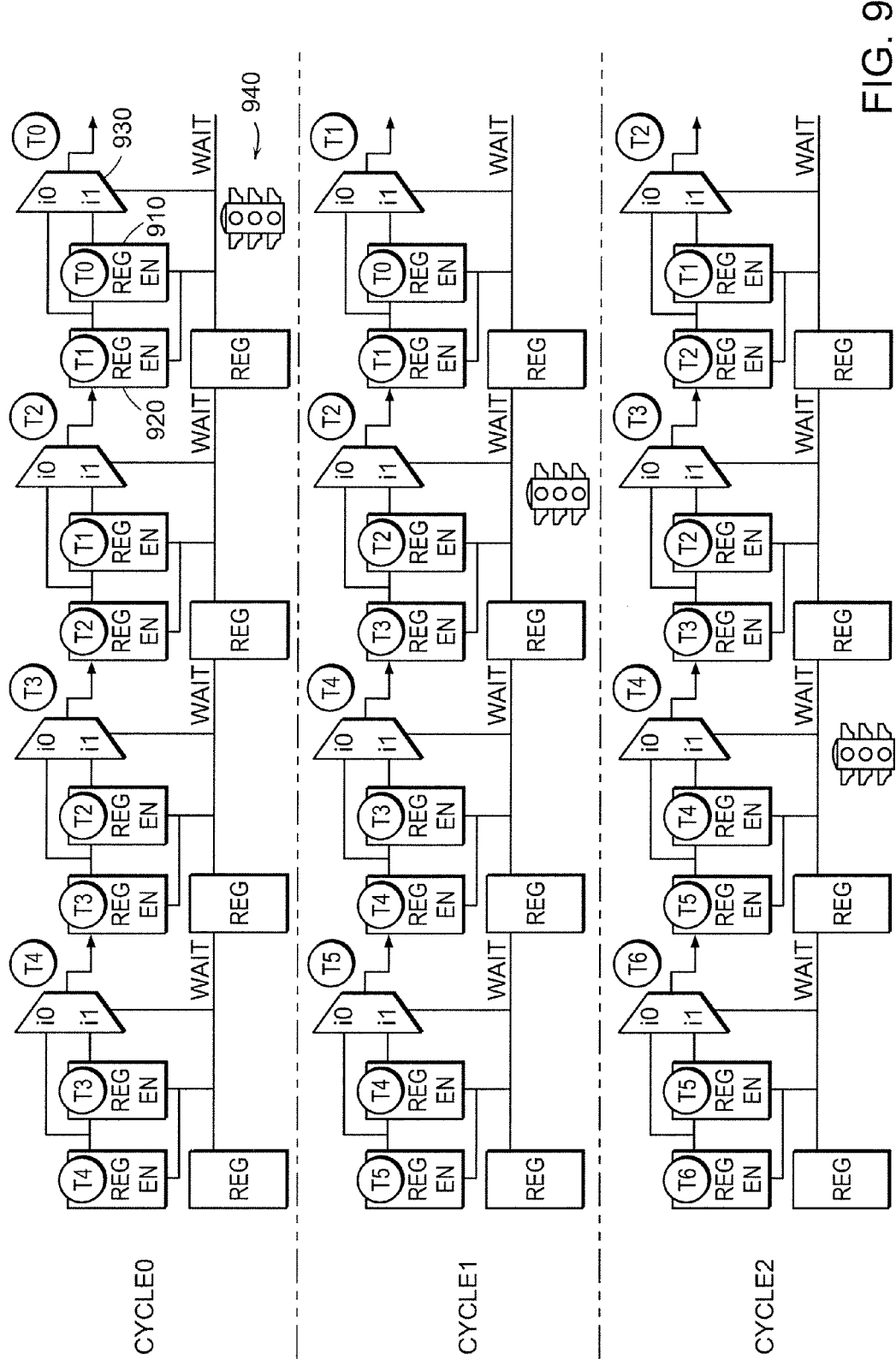
FIG. 9 demonstrates the use of the mesh network under heavy traffic conditions.

FIG. 9 demonstrates the detailed circuit of a 1D slice of the mesh network under heavy traffic conditions. When there is no congestion, the throughput of the network is one transaction per clock cycle, per node, and per direction. When there is routing congestion and one transaction loses arbitration to another, a wait indicator is sent in the direction of the source transaction that lost the arbitration. This indicator tells the previous core that there is congestion and that the previous core cannot send another transaction. Each network node registers the wait indicator and sends it onwards in every direction that has requested the port in question. In this way, backwards pressure is generated in a radial fashion outwards from the original point of congestion.

Circuits that allow the mesh network to operate efficiently are the transaction registers 910, 920, and a mux 930 that selects between the master/slave register and the pipelined wait signal 940. Since each network node has exactly one slave register and the wait signal propagates backwards at a speed of 1 clock cycle per network node, there is no data lost. In the case of the mesh network proposed, the slave registers in each node are used the first cycle after the wait indication has been released. FIG. 9 illustrates a three cycle scenario of a 1-D demonstration of the mesh network with a wait indication. In the example, a wait is indicated by the red stop light. The red stop light propagates backwards in the chain in cycle 1 and cycle 2. As demonstrated, no data is lost in the stalling of the network due to the use of the shadow register and the bypass mux.

APPLICATIONS

Previous work on systolic arrays show that high computational efficiency can be reached by mapping an algorithm onto a physical processor and using spatial concurrency to reduce communication bottlenecks imposed by long wires. Challenges with systolic arrays has been a limited amount of flexibility and physical challenges of keeping data moving in lock step through the array. By replacing a register with a software programmable processor containing a sequencer and memory in addition to the processing element, the flexibility and ease of implementation is greatly improved.

Four application examples are provided to demonstrate how the NOC behaves under associated traffic patterns.

Figure 10:
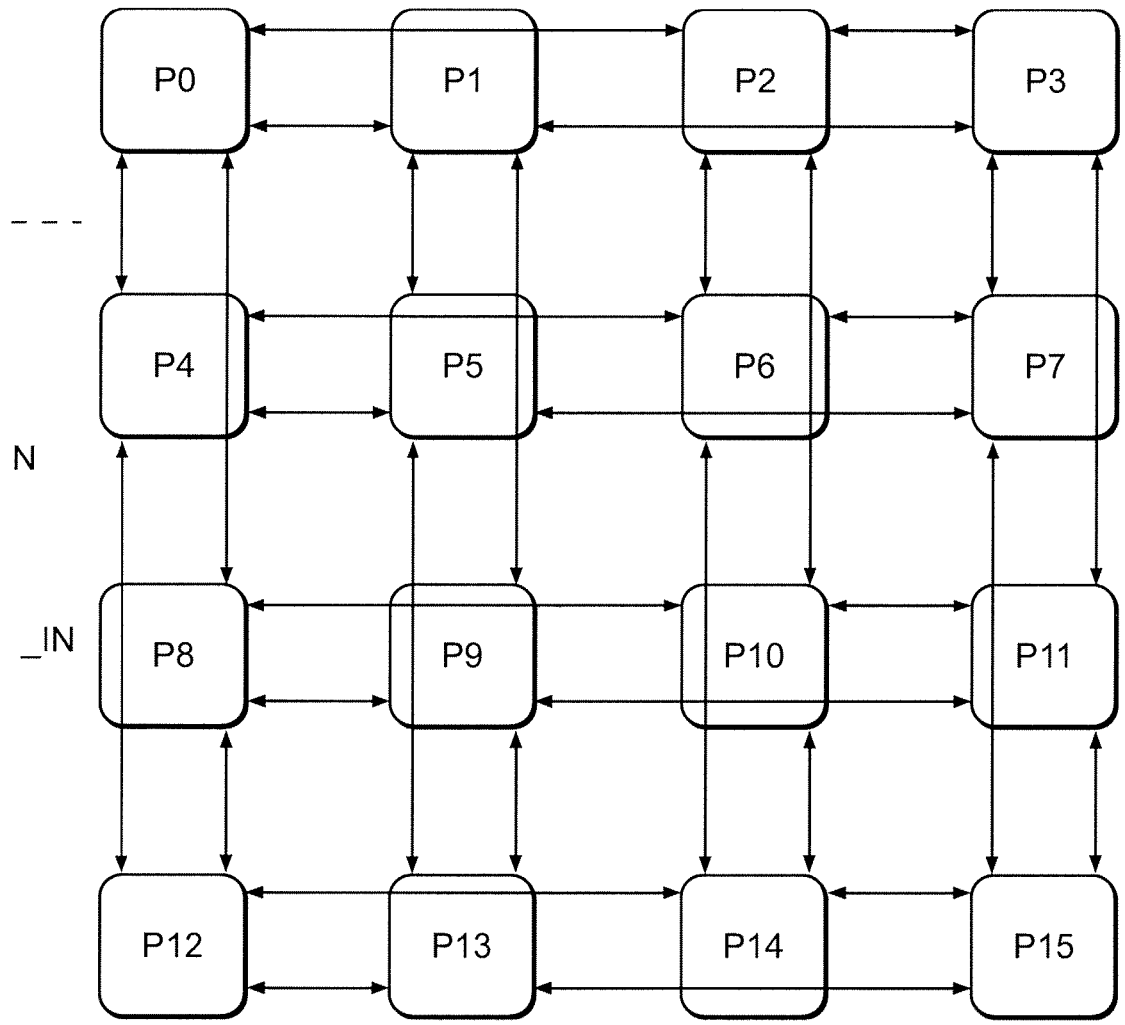
FIGS. 10-13 are schematics demonstrating certain applications of the network.

Referring to FIG. 10, one important digital signal processing kernels is the Fast Fourier Transform (FFT). Its recursive nature makes it well suited for parallel implementation, either as a linear systolic array or as a parallel array implementation. FIG. 4 shows how a large complex FFT can be mapped onto a 16 processor network. For an N point FFT, each processor node performs an N/16 point FFT. There are 4 FFT stages for combining data. Combination stage 1 and 3 involve nearest neighbor communication two of the stages involve next to nearest neighbor communication.

The next to nearest neighbor communication creates contention on the data links and can potentially cause a degradation in performance. However, in the case of a distributed FFT, due to the large amount of computation, the overhead associated with network contention is less than 5%.

Figure 11:
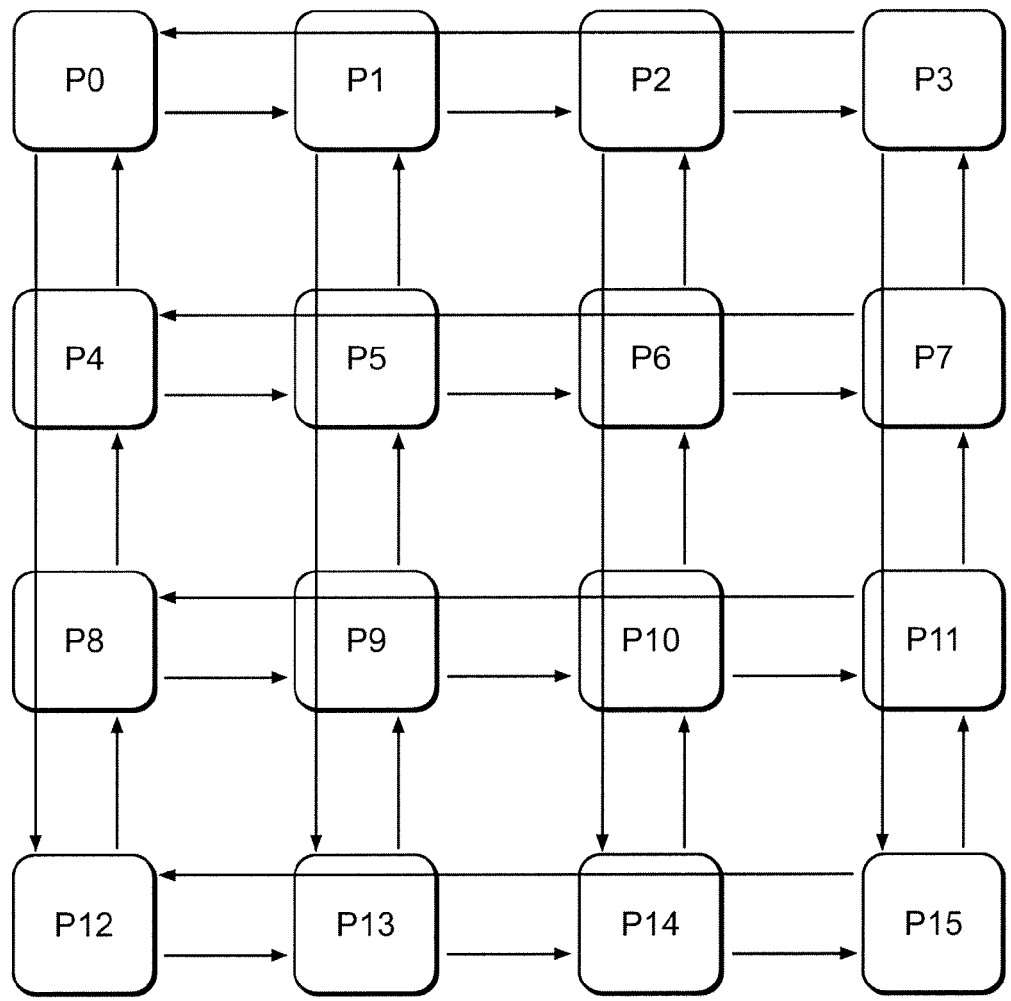

Referring to FIG. 11, matrix multiplication is another example of a compute intensive operation that is readily distributed across a large number of parallel processors. The problem of matrix multiplication can be solved using a systolic algorithm. A and B matrices of size P are decomposed into sqrt(P)×sqrt(P) sub-matrices. A and B sub-matrices are multiplied together and accumulated in a local C sub matrix at each node. After each sub-matrix multiplication, the A matrix is shifted up and the B matrix is shifted to the right. The network can achieve 100% efficiency as there is never contention on the data transmission links.

Figure 12:
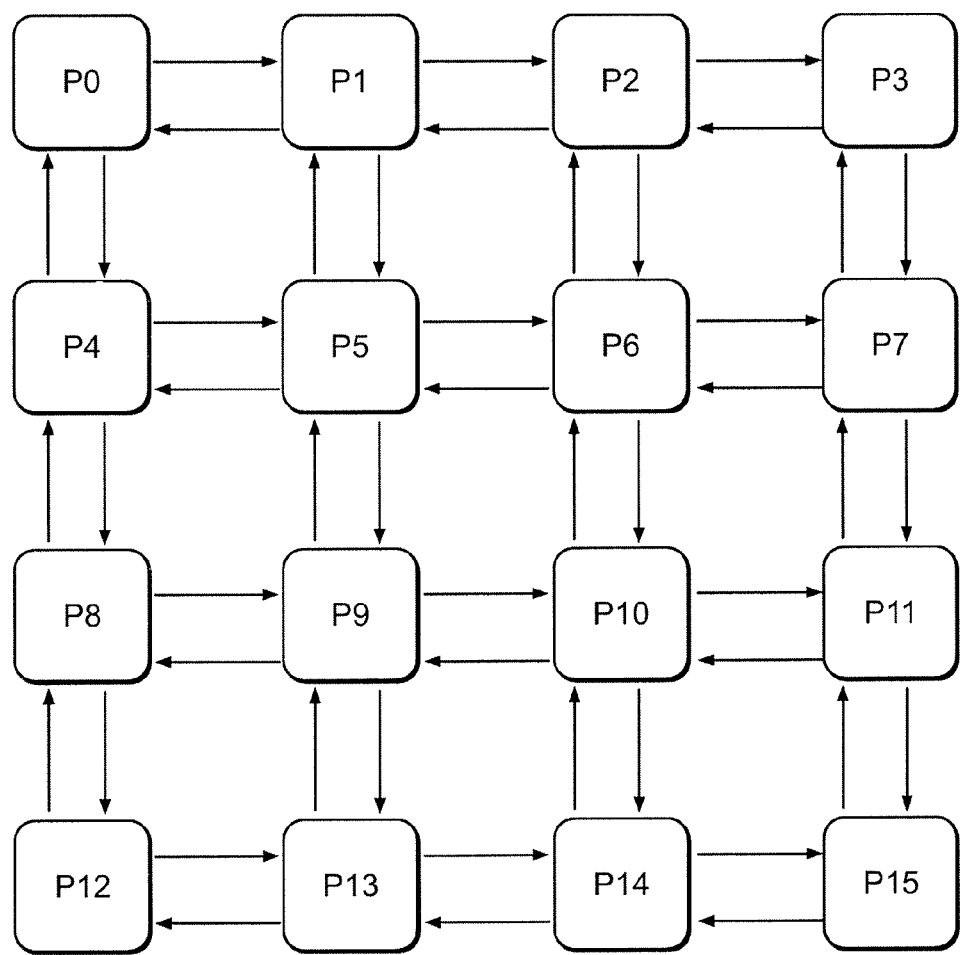

Referring to FIG. 12, a number of applications can be efficiently mapped onto 2D mesh networks by using block data decomposition. A problem is mapped onto a grid, with each node in the grid given responsibility for computing a portion of the larger problem. Each one of the processors works completely independently from all others, with the exception of some limited communication with its neighboring elements to the North, East, West, and South (NEWS). FIG. 12 shows the traffic patterns involved with NEWS-based communication. Since none of the links are shared in this type of communication, the network reaches its full theoretical capacity and keeps a constant 1 cycle latency for all conditions.

Figure 13:
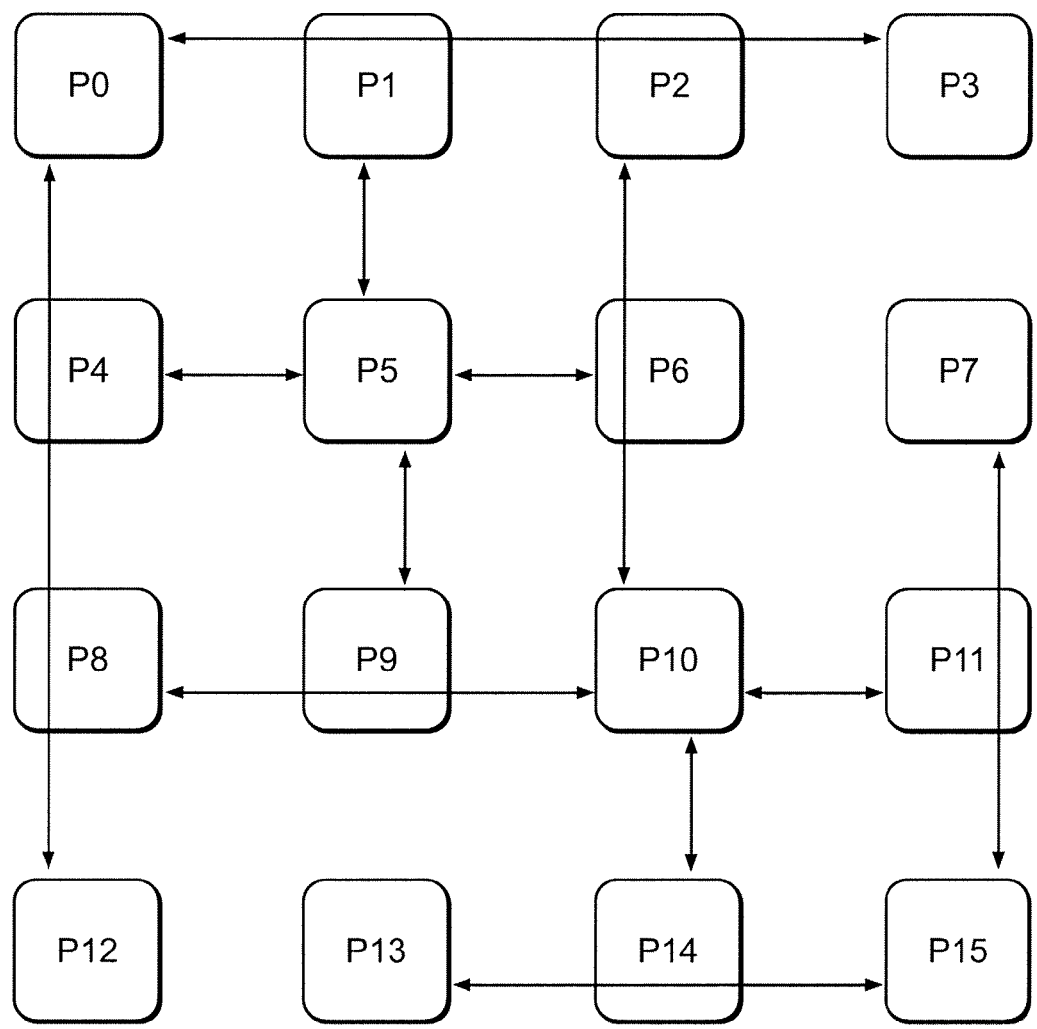

Referring to FIG. 13, matrix transpose communication pattern is important in a number of signal processing applications. Consider a large matrix mapped onto a 2D mesh topology with each processor node in the mesh responsible for a M×N sub matrix. For a transpose operation, the data communication would appear as shown in FIG. 13. In this case, to achieve 100% efficiency of the network links, an adaptive routing method is used to balance the network traffic. The algorithm works by sensing backpressure at each routing node and choosing an open direction if one direction is blocked. The routing is always done towards the target.

Other embodiments are within the following claims. For example, while certain specific circuitry has been shown, alternative forms of circuitry could be implemented. While described primarily in conjunction with a 3-D implementation, as indicated above, the mesh network could be arranged as a two-dimensional array. While the description refers to directions such as horizontal and vertical, these are general terms of reference to be taken relative to each other and not as absolute directions.

What is claimed:
1. A mesh network processing system comprising:
a plurality of processing nodes arranged in a two-dimensional array, each processing node including
a processing element,
a switch being addressable through unique coordinates reflecting the processing node's physical position in the two-dimensional array, and
an interface coupled to the processing element and the switch;
each of the switches being coupled to the interface of one of the processing nodes, and also coupled to at least one other switch; and
wherein the processing nodes send data in transactions that include at least (a) a full address of a particular switch of a particular processing node, comprising:
(i) unique coordinates of the particular switch; and
(ii) an address into an address space of a processing element of the particular processing node,
so that each switch can be addressed using a single transaction such that each transaction can be routed to its destination independently from all other transactions and (b) data, wherein the transactions include write transactions and read transactions, wherein:
a write transaction includes a write indicator, a full destination address comprising (i) unique coordinates of a destination node for the write transaction and (ii) a destination address into an address space of the destination node's processing element, and data to be written, and
a read transaction includes a read indicator, a full source address comprising (i) unique coordinates of a source node initiating the read transaction and (ii) a source address into an address space of a processing element of the source node, and data that includes a full destination address comprising (i) unique coordinates of a destination node for the read transaction and (ii) a destination address into an address space of a processing element of the destination node, wherein each switch is configured to determine a direction to send a transaction by comparing the unique coordinates of the transaction to the unique coordinates of the switch.

2. The system of claim 1, wherein read transactions are performed as split transactions, such that the full source address of the node initiating a read transaction is sent along with the read transaction to fetch the data, and when the data is fetched, the read transaction is turned into a write transaction and the full source coordinates are used as a full destination address to be sent along with the data.

3. The processing system of claim 1, wherein the system provides for broadcasting of data to processing nodes by columns, rows, planes, and/or to all of the processing nodes using a single data transaction.

4. The processing system of claim 1, wherein each processing node has a selectable routing scheme and is configurable to allow the routing along a plurality of directions to be performed in one of a plurality of different possible manners.

5. The processing system of claim 4, wherein the routing can cause successive transactions to from a source to a destination to take different paths from the source to the destination.

6. The processing system of claim 1, wherein a switch can provide a wait signal to an adjacent switch that is providing a transaction to the switch to create back pressure, thereby allowing a single distributed stalling of a signal without having to send a global interconnect.

7. The processing system of claim 6, wherein each switch has a first register and a second register, the switch causing a transaction to be moved from the first register to the second register in response to receiving a wait indication from another switch, thereby allowing another transaction to be received from still another switch and stored in the first register.

8. The processing system of claim 1, further comprising an additional plurality of processing nodes, such that the processing nodes are arranged in a three-dimensional array.

9. The processing system of claim 1, wherein each processing element is one of a software programmable processor, a hardware accelerator, and a piece of memory.

* * * * *